D. M. WILDER.
EXCAVATING AND CONVEYING APPARATUS FOR STARCH.
APPLICATION FILED JULY 31, 1913.
1,102,376.
Patented July 7, 1914.
4 SHEETS—SHEET 1.
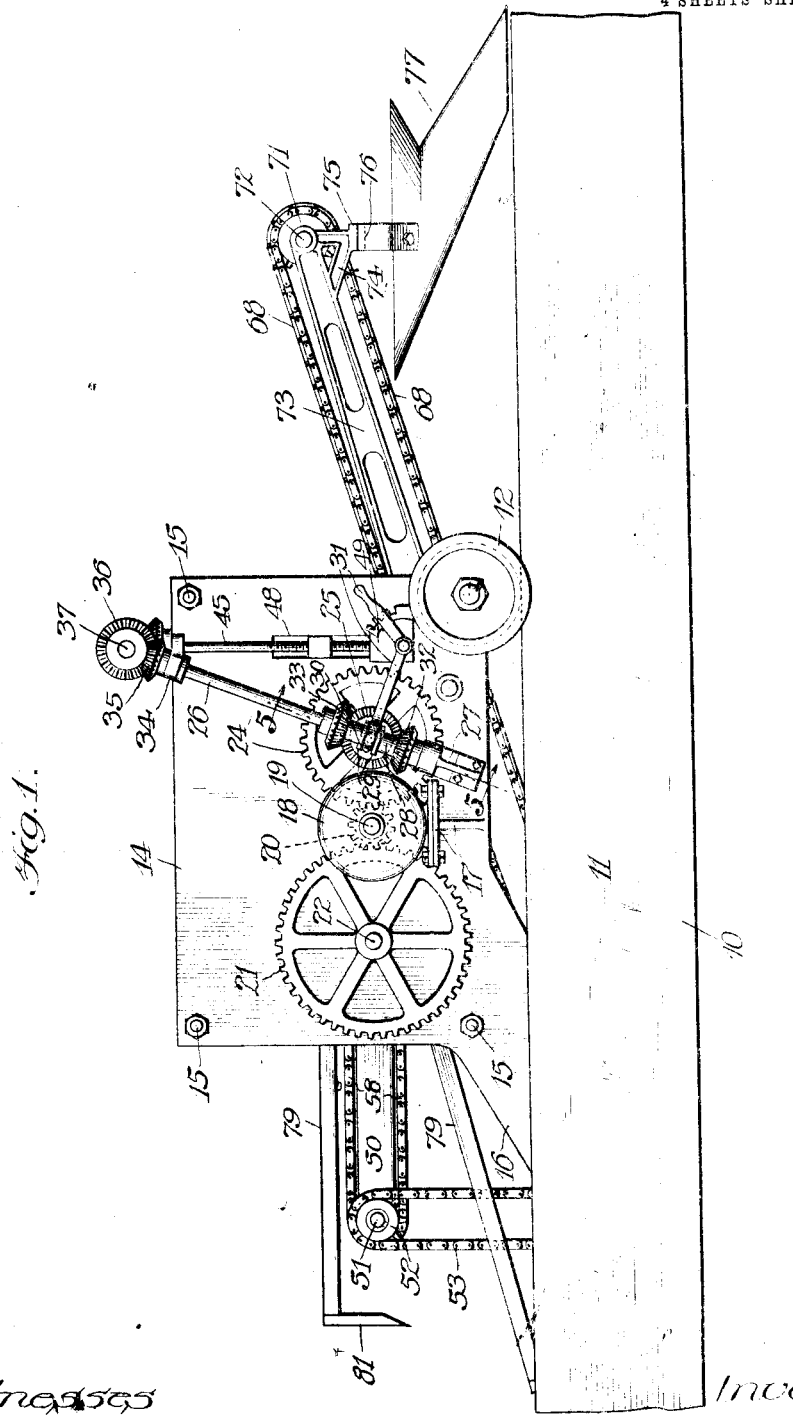

D. M. WILDER.
EXCAVATING AND CONVEYING APPARATUS FOR STARCH.
APPLICATION FILED JULY 31, 1913.
1,102,376.
Patented July 7, 1914.
4 SHEETS—SHEET 2.
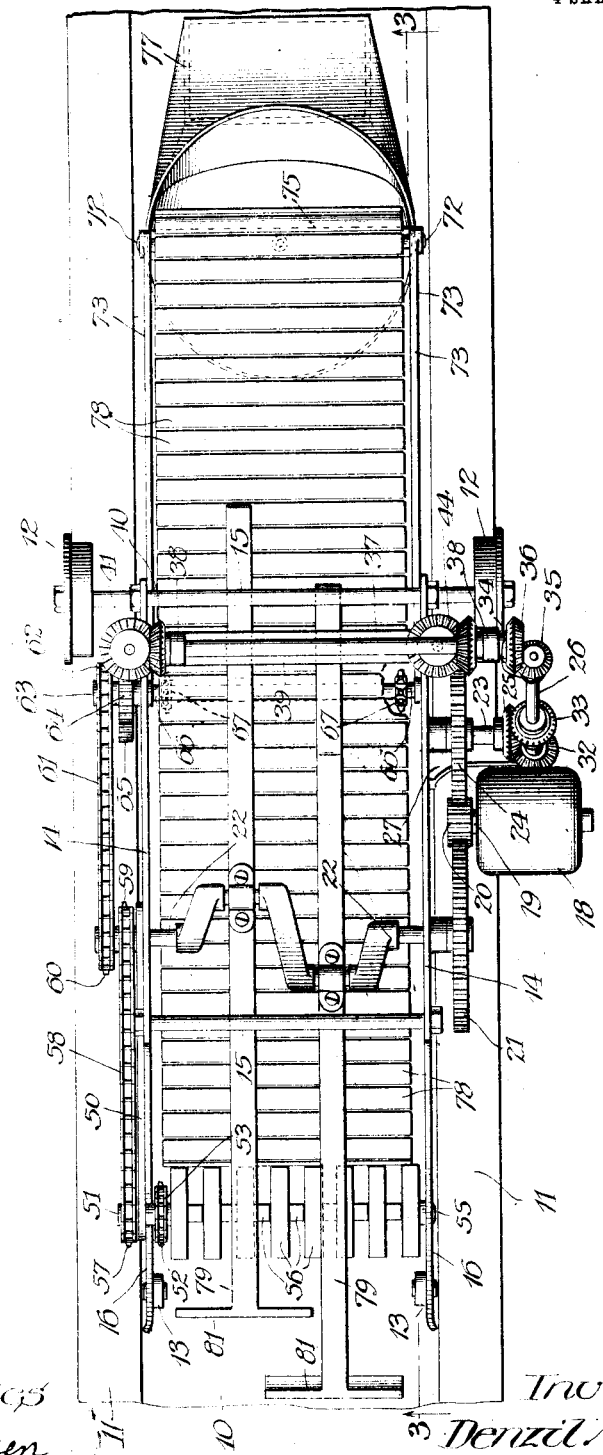

D. M. WILDER.
EXCAVATING AND CONVEYING APPARATUS FOR STARCH.
APPLICATION FILED JULY 31, 1913.
1,102,376.
Patented July 7, 1914
4 SHEETS—SHEET 3.
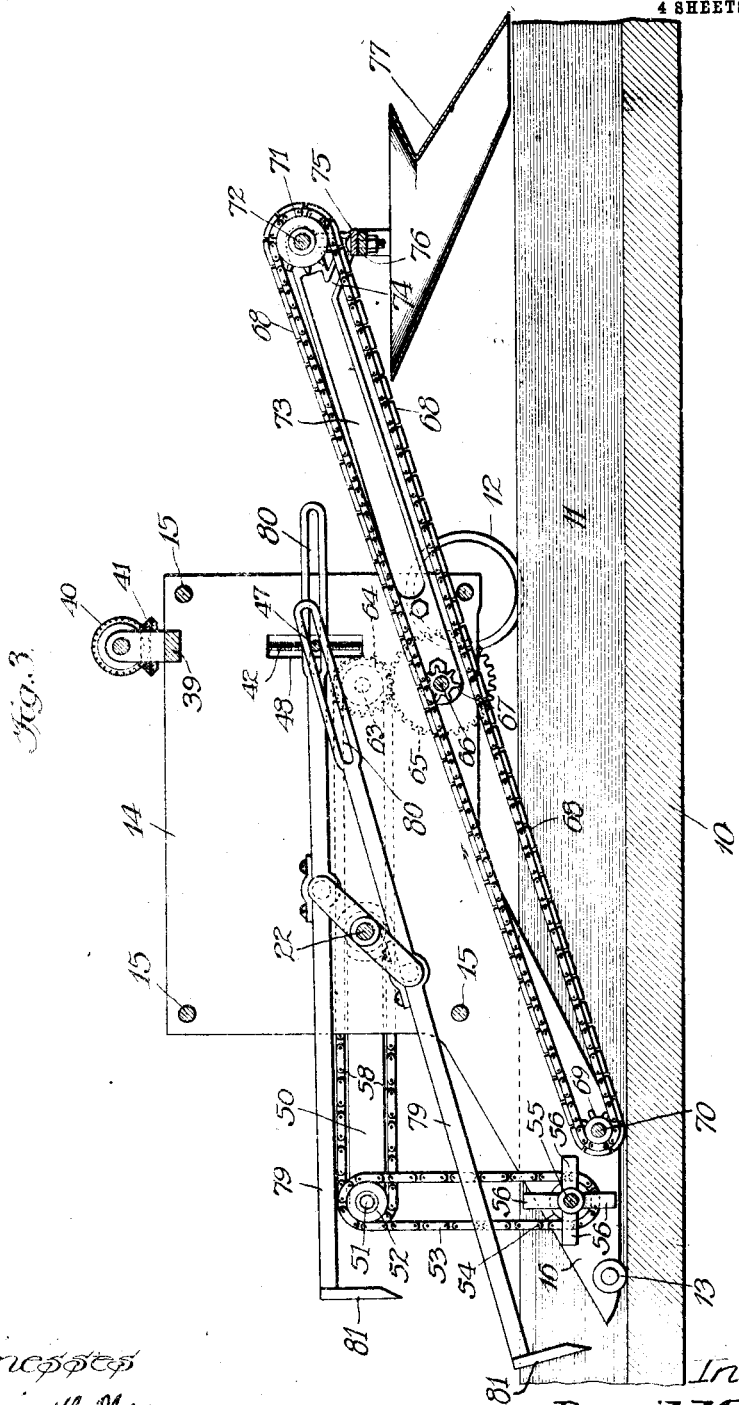

D. M. WILDER.
EXCAVATING AND CONVEYING APPARATUS FOR STARCH.
APPLICATION FILED JULY 31, 1913.
1,102,376.
Patented July 7, 1914
4 SHEETS—SHEET 4.
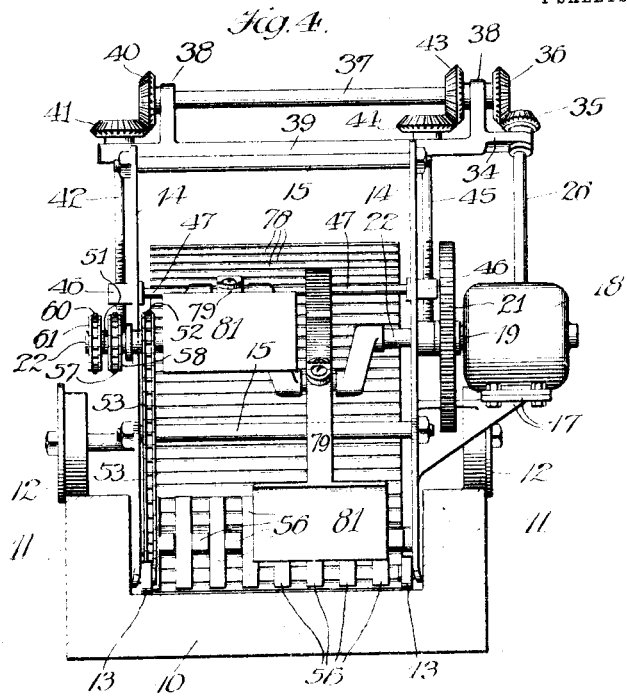
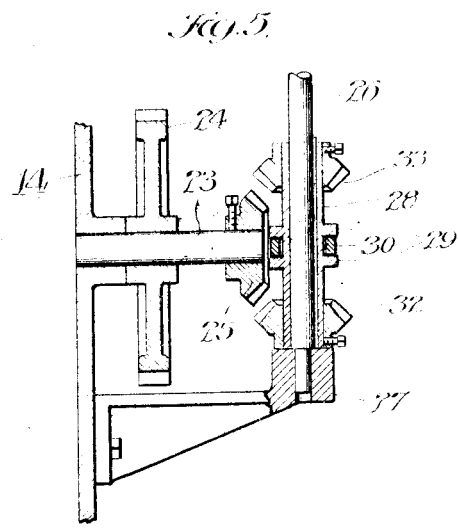

UNITED STATES PATENT OFFICE.

DENZIL M. WILDER, OF SHABBONA, ILLINOIS.

EXCAVATING AND CONVEYING APPARATUS FOR STARCH.

1,102,376.  Specification of Letters Patent.  Patented July 7, 1914.

Application filed July 31, 1913. Serial No. 782,237

*To all whom it may concern:*

Be it known that I, DENZIL M. WILDER, citizen of the United States, residing at Shabbona, in the county of Dekalb and State of Illinois, have invented certain new and useful Improvements in Excavating and Conveying Apparatus for Starch, of which the following is a specification.

This invention relates to improvements in an apparatus to be used for handling starch in the process of the manufacture of the same, and it consists in certain peculiarities of the construction, novel arrangement and operation of the various parts thereof, as will be hereinafter more fully set forth and specifically claimed.

As is well known to those skilled in the art to which my invention pertains, it is the usual practice in the process of manufacturing and preparing starch for use and the market to deliver the starch water of suitable consistency to long settling tables of trough-like or tray form, in which the starch settles, and is commonly shoveled therefrom, manually, onto suitable conveyers located parallel with and between said troughs or tables, by means of which conveyers it is carried to and dumped into receptacles for further treatment. The foregoing manner of shoveling the starch is comparatively slow, tedious, expensive and laborious, and it is one of the objects of my invention to provide an apparatus for handling starch which is adapted for use on the aforesaid settling troughs or tables and in connection with conveyers of the above named type, if desired, without any material change in such equipment, which shall be simple and inexpensive in construction, strong, durable and efficient in operation, by means of which the starch can be removed from the settling troughs onto the conveyers with a great saving in time, labor and expense.

A further object of the invention is to provide an apparatus of the above named general character, which can be readily transferred from one trough to another, and will dig up, excavate and convey the starch from the trough on which the apparatus is located, in such a manner as to deposit it on a conveyer on either side of the trough.

Still another object is to provide means for regulating the strokes of the hoes or diggers of the machine.

Various other objects and advantages of the invention will be disclosed in the subjoined description and explanation.

In the accompanying drawings, which serve to illustrate the invention—Figure 1 is a view in side elevation of a portion of a settling trough with my apparatus for handling starch mounted thereon ready for operation, and showing at the rear ends of said apparatus a portion of an adjustable chute for transferring the starch to a conveyer on either side of the settling trough; Fig. 2 is a plan view of like parts; Fig. 3 is a view taken on line 3—3 of Fig. 2, looking in the direction indicated by the arrows; showing parts in section and parts in elevation; Fig. 4 is a front end view of the apparatus, showing the trough in section, and Fig. 5 is a sectional view taken on line 5—5 of Fig. 1, looking in the direction indicated by the arrows, and illustrating a part of the mechanism used for regulating the strokes of the hoes or diggers of the apparatus.

Like numerals of reference refer to corresponding parts throughout the different views of the drawings.

The reference numeral 10 designates a portion of one of the settling troughs for the starch, on which my improved apparatus is mounted, for the purpose of removing the same therefrom. This trough, as well as the others, (not shown) of the series of parallel troughs of a starch factory, on one or both sides of which may be located in parallelism therewith, a conveyer (not shown), has upright sides 11, the upper surfaces of which form rails or tracks upon which the wheels 12, of the frame of the apparatus may travel, and the inner surfaces or walls of said uprights provide retaining walls for the starch solution or liquid.

As is clearly shown in the drawings, the frame of the apparatus includes two upright side pieces 14, which are secured together in parallelism by means of transverse tie rods 15, preferably located at or near each of the corners of said side pieces, which latter are so spaced as to be located at their lower portions near the inner surfaces of the upright sides 11, of the settling trough 10, yet in such a manner as to be moved therebetween without friction. The front portion of each of the sides 14, of the frame is provided with a downward and forwardly extended projection 16, on the lower portion of each of which extensions is journaled a roller or small wheel 13, to travel on the floor of the trough 10, near its side walls. Mounted on the lower portion of one of the sides 14 of the frame, is a bracket 17, which supports an electric motor 18, of the ordinary or any preferred construction, which may have motive power supplied thereto through a suitable connection, in any well-known manner (not shown).

Mounted on the driving shaft 19, of the motor 18, between the latter and the side 14 of the frame adjacent thereto is a gear 20, which meshes with a gear 21, mounted on one end of a crank shaft 22, which is transversely and horizontally journaled in the sides 14 of the frame, and which in the present instance is shown as being of the duplex or double crank type, but it will be understood that said crank shaft may have one or a plurality of cranks without departing from the spirit of the invention.

Mounted on a stub shaft 23, which is extended horizontally from the side 14 of the frame on which the motor 18 is mounted, and rearwardly of the latter, is a gear 24, which also meshes with the gear 20 on the driving shaft of the motor. On the outer portion of the shaft 23, is mounted a beveled gear 25, for the purpose to be presently explained. An upwardly and rearwardly inclined shaft 26, which is journaled at its lower portion in a bearing 27, supported on the side 14 of the frame which carries the motor, has slidably, but non-rotatably mounted thereon, a sleeve 28, which is provided with an annular collar 29, at about its middle, for engagement with the forks 30 of a lever 31, which is suitably fulcrumed on the side 14 of the frame. Rigidly mounted on the sleeve 28, near its lower end is a beveled gear 32, and mounted in a like manner on the upper portion of said sleeve is a beveled gear 33, which are adapted to mesh alternately with the beveled gear 25, when thrown into gear therewith by means of the lever 31, but normally the gears 32 and 33 are neutral or idle. The upper portion of the shaft 26 is journaled in a bracket 34, extended laterally from the upper portion of the side 14, which carries the motor, and is equipped on its upper end with a beveled gear 35, which meshes with a beveled gear 36, on the adjacent end of a shaft 37, which is horizontally and transversely journaled on uprights 38, of a frame 39, mounted on the rear upper portion of the sides 14 of the frame. The opposite end of the shaft 37 has mounted thereon a beveled gear 40, which meshes with a beveled gear 41, on the upper portion of a screw threaded shaft 42. Near the beveled gear 36, the shaft 37, has mounted thereon a beveled gear 43, which meshes with a beveled gear 44, on the upper portion of a screw threaded shaft 45, which latter shaft as well as the shaft 42, has threaded engagement with blocks 46, mounted on each end of a transverse rod 47, which is extended horizontally through vertical slots 48, in the sides 14 of the main frame near their lower ends. The lower ends of the shafts 42 and 45 are swiveled in suitable bearings 49, one of which is extended laterally and outwardly from each of the sides 14, of the frame and to below the slots 48 thereon.

Extended forwardly from the front portion of the side 14 of the frame opposite that on which the motor is mounted is a horizontal arm 50, on the front end of which is mounted a stub shaft 51, which is provided on its inner end with a sprocket wheel 52 around which is passed a sprocket chain 53, which engages a sprocket wheel 54, on one end of a shaft 55, which is horizontally journaled on the lower portion of the extensions 16 of the frame rearwardly of the wheels or rollers 13 thereon. The shaft 55 is equipped with a number of radial arms 56, which are of sufficient length to almost touch or scrape the bottom of the trough, and together with the shaft 55, constitute what I shall term a "kicker."

As shown in Figs. 2 and 4 of the drawings, the arms 56 of the kicker are alternately arranged at right angles to one another, thus providing means to thoroughly move the starch backwardly and onto the conveyer after the starch has been dug up by the hoes, as will be presently explained. On the outer end of the shaft 51, is mounted a sprocket wheel 57, around which passes a sprocket chain 58, which also passes over a sprocket wheel 59, mounted on the crank shaft 22, outwardly of the side 14 of the frame opposite that side on which the motor is mounted. Mounted on the crank shaft 22, externally of the wheel 59, is another wheel 60, around which passes a sprocket chain 61, which also passes around a sprocket wheel 62, mounted on a stub shaft 63, extended horizontally and outwardly from the last named side of the frame. The stub shaft 63 carries a pinion 64, which meshes with a gear 65, mounted on one end of a shaft 66, which is transversely journaled on the rear portion of the sides 14 of the frame at the lower part thereof. Near the inner surface of each of the sides 14 of the frame, the shaft 66 has mounted thereon a sprocket wheel 67, over which pass conveyer or sprocket chains 68, which chains also pass over sprocket wheels 69, mounted on a shaft 70, transversely journaled on the lower portion of the extensions 16, of the sides 14, but rearwardly and below the shaft 55, which carries the kicker arms. The sprocket chains 68, also pass over sprocket wheels 71, mounted on a shaft 72, which is transversely journaled on the rear and upper portions of a pair of extensions 73 or arms, one of which is extended rearwardly and upwardly from the lower portion of each of the sides 14 of the frame. Each of the arms 73 is provided at its upper end with a depending bracket 74, which are united by a cross piece 75, to which a cross piece 76, on the upper part of a chute 77, is swiveled, so that the chute, the mouth of which extends below the upper or discharging portion of the conveyer chains 68, may be turned to either side, in order to guide the starch from the conveyer of my apparatus to the ordinary conveyers, which, as before stated, are located longitudinally on the sides of the trough. The chains 68, may be provided with any suitable conveying or carrying material, but in the present instance I have shown them as being united by means of slats 78, which are spaced a slight distance apart so as to allow them to pass around the sprocket wheels which support them. The chute 77, may be made of any suitable material and of any preferred construction, but, as before stated, is preferably swiveled on the cross bar 75, of the supporting arms 73, so that it can be turned to either side of the trough.

Pivotally mounted on each of the cranks of the crank shaft 22, between its ends, is an arm or handle 79, each of which has in its rear portion an elongated slot 80, for the reception and operation of the transverse rod 47, which, as before stated, is adjustably mounted on the screw threaded shafts 42, at the rear portion of the frame of the apparatus. Each of the arms or handles 79, has on its front end a hoe 81, usually of broad flat type, as is clearly shown. These hoes are employed to dig up the caked starch within the trough, and in their tedder action will throw or move the starch rearwardly toward the kicker arms 56, which in turn will cause it to pass onto the conveyer 78, by means of which it will be carried rearwardly and upwardly between the sides 14 of the frame and to be deposited into the chute 77, which may be manipulated as desired to deposit the starch at either side of the settling trough on an ordinary conveyer (not shown).

From the foregoing and by reference to the drawings, it will be readily understood and clearly seen, that the crank shaft 22, will be driven through its gearing with the motor 18, and that as said shaft is geared to the kicker shaft 55, the last named shaft will be rotated in the proper direction, thus moving the starch rearwardly and upwardly onto the conveyer 78, which conveyer is also driven through its gearing with the crank shaft. As the handles or arms 79, are pivotally mounted on the cranks of the crank shaft, and loosely mounted on the shaft 47, it is apparent that in the rotation of the crank shaft the hoe equipped arms 79, will be given vertical and reciprocal movements, the reciprocation of said arms occurring at the uppermost and lowermost parts of the strokes of the hoes thereon, thus causing said hoes to not only act as diggers, but also as scrapers for moving the starch rearwardly or toward the kicker.

In order to regulate the stroke of the arms 79, and hoes 81 thereon, the lever 31, may be moved in the proper direction so as to cause the sleeve 28 to slide on the shaft 26, and thus throw either the beveled gear 32 or 33, as may be desired, into mesh with the beveled gear 25, which is driven through its gearing with the motor.

It is manifest that as the frame is equipped with wheels or rollers 12 and 13 respectively, which travel on the trough, the apparatus can be easily reciprocated on the latter in the proper direction, and manually if desired.

While I have shown and described my invention in one of its embodiments, it will be understood that various changes may be made without departing from the scope of the appended claims; for instance, I may employ one or more of the hoe equipped tedder acting arms, or may make various other changes without departing from the spirit of the invention.

Having thus fully described my invention, what I claim as new and desire to secure by Letters Patent is—

1. An apparatus of the class described including in combination a frame, a hoe-equipped-arm mounted on said frame for vertical and reciprocal movement at its front end, a vertically adjustable rod transversely and horizontally mounted on the frame and having loose connection with said arm, means to vertically adjust said rod, and means to operate said arm.

2. An apparatus of the class described including in combination a frame, a plurality of hoe-equipped-arms mounted on said frame for vertical and reciprocal movement at their front ends, a vertically adjustable rod horizontally and transversely mounted on the frame and having loose connection with said arms, means to adjust said rod, and means to operate said arms.

3. An apparatus of the class described including in combination a frame, a plurality of hoe-equipped-arms mounted on said frame for vertical and reciprocal movement at their front ends, means to regulate the stroke of said arms, a conveyer carried by the frame and extended upwardly and rearwardly from the front lower portion thereof, a kicker shaft transversely journaled on the frame in front of the forward portion of the conveyer and having radial arms thereon, and means to operate the hoe-equipped-arms, the conveyer, and the kicker shaft simultaneously.

4. An apparatus of the class described including in combination a frame, a hoe-equipped-arm mounted on said frame for vertical and reciprocal movement at its front end, means to regulate the stroke of said arm, a conveyer carried by the frame and extended upwardly and rearwardly from the lower front portion thereof, a kicker shaft transversely journaled on the frame in front of the forward portion of the conveyer and having radial arms thereon, and means to operate the hoe-equipped-arm, the conveyer and the kicker shaft simultaneously.

5. In an apparatus of the class described, the combination with a frame of a crank shaft transversely journaled thereon, means to drive said shaft, a plurality of hoe-equipped-arms pivotally mounted on said crank shaft and having longitudinally extended slots in their rear portions, a rod horizontally and transversely mounted for vertical adjustment on the frame and extended through said slots, a conveyer carried by the frame and extended upwardly and rearwardly from the front lower portion thereof, a rotary kicker transversely journaled on the frame in front of the forward portion of the conveyer, and gearing uniting said kicker and conveyer.

DENZIL M. WILDER.

Witnesses:
H. W. YOUNG,
C. P. HALLAM.